G. H. MILLER.
AUGER DEFLECTOR.
APPLICATION FILED DEC. 20, 1909.
973,537.
Patented Oct. 25, 1910.
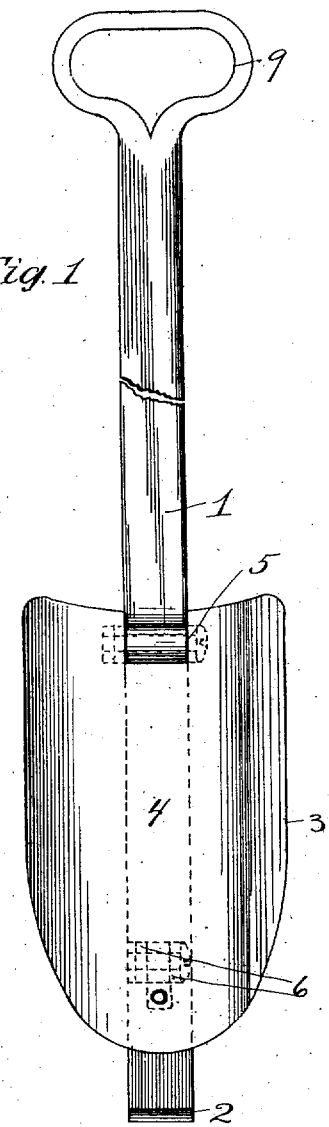
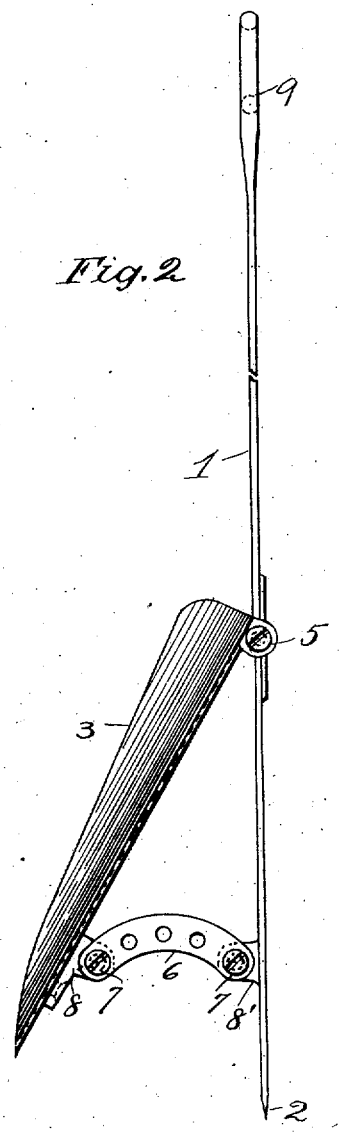
Witnesses
P. Bredel
Geo. O'Willet
Inventor
George H. Miller
by Wm. McMonroe
Attorney

UNITED STATES PATENT OFFICE.

GEORGE H. MILLER, OF NORWALK, OHIO.

AUGER-DEFLECTOR.

973,537.  Specification of Letters Patent. Patented Oct. 25, 1910.

Application filed December 20, 1909. Serial No. 534,202.

*To all whom it may concern:*

Be it known that I, GEORGE H. MILLER, a citizen of the United States, and resident of Norwalk, in the county of Huron and State of Ohio, have invented certain new and useful Improvements in Auger-Deflectors, of which I hereby declare the following to be a full, clear, and exact description, such as will enable others skilled in the art to which it appertains to make and use the same.

The objects of the invention are to provide adjustable means for deflecting an earth auger or other boring or drilling tool, so as to change the working angle thereof.

The device is particularly applicable to enlarging the lower end of a hole in the ground to provide for the insertion of a spreading earth anchor, used to hold a guy or straining rope of any description, especially for the use of an anchor, such as described in Letters Patent granted to me on May 16th, 1905, bearing Number 789,990.

The invention comprises a tool adapted for insertion in the opening and provided with an inclined deflecting plate or surface, the angle of inclination of which to its draw bar or stem is capable of adjustment so as to deflect the boring tool to any angle desired.

The deflecting tool and its stem can be turned around in the hole to permit of enlarging the bottom of the hole in any direction. For use with the anchor described the enlargement of the hole required will be in diametrically opposite direction, to make room for the lateral extension of the anchor.

The invention further consists in the combination and arrangement of parts and construction of details as hereinafter described, shown in the accompanying drawings and specifically pointed out in the claims.

In the accompanying drawings Figure 1 is a front elevation of the device; Fig. 2 is a side elevation thereof.

In these drawings 1 is a stem or draw bar, preferably sharpened at its lower end, 2, for insertion in the ground at the bottom of the hole, to give stability to the tool while the boring tool is operating; 3 is the deflector plate preferably provided with a concave face 4, against which the boring tool is adapted to work. This plate with the deflecting surface is preferably pivotally attached to or angularly adjustable relative to the stem 1, at its upper end, 5, and is adjustably secured at its lower end to the stem to permit of lateral adjustment at that end. The adjusting means may comprise a link or links 6, attached by means of bolts or pins or screws 7, 7, to lugs 8, $8^1$, in the plate and stem respectively. The link 6 is preferably curved and is perforated at intervals so that when one of the bolts or pins or screws in one member is removed, the link can be folded upon the other member as upon a hinge, without striking against it, and the bolt removed can be inserted in any one of the openings to lessen or widen the angle between the plate and stem. The upper end of the stem is preferably provided with an eye 9 for convenient handling.

Having described the invention, what I claim as new and desire to secure by Letters Patent is, 1. In combination, a stem, and a deflecting plate adapted to rotate thereon at the upper end of said plate, and means for increasing and diminishing the distance between the lower end of the plate and the stem.

2. In combination, a stem, a deflecting plate pivoted at its upper end thereon, and an adjustable device adapted to secure the lower end of the plate to the stem.

3. In combination, a stem having a sharpened lower end, a deflector plate adapted to rotate at its upper end on said stem, and a link adapted to connect adjustably the lower ends of said plate and stem.

4. In combination, a stem, a plate adapted to rotate at its upper end upon said stem, and a link, adapted to connect the lower end of said plate and said stem, said stem and plate having openings, and said link provided with openings at intervals therein, and bolts adapted to enter said openings.

5. In combination, a stem, a curved deflecting plate adapted to rotate at its upper end on said stem, and a curved link adapted to connect the lower end of said plate and said stem, said link adapted to fold on one of said members for adjustment and provided with openings at intervals, and bolts adapted to connect said plate, stem and link in its adjustable position.

In testimony whereof, I hereunto set my hand this 16th day of November 1909.

GEORGE H. MILLER.

In presence of—
Wm. M. Monroe,
H. C. Boyd.